United States Patent
Rohatgi et al.

(10) Patent No.: US 11,101,981 B2
(45) Date of Patent: *Aug. 24, 2021

(54) GENERATING A PSEUDORANDOM NUMBER BASED ON A PORTION OF SHARES USED IN A CRYPTOGRAPHIC OPERATION

(71) Applicant: Cryptography Research, Inc., Sunnyvale, CA (US)

(72) Inventors: Pankaj Rohatgi, Los Altos, CA (US); Elke De Mulder, Kirkland, WA (US); Michael Hutter, Walnut Creek, CA (US)

(73) Assignee: Cryptography Research, Inc., San Jose, CA (US)

(*) Notice: Subject to any disclaimer, the term of this patent is extended or adjusted under 35 U.S.C. 154(b) by 112 days.

This patent is subject to a terminal disclaimer.

(21) Appl. No.: 16/444,758

(22) Filed: Jun. 18, 2019

(65) Prior Publication Data

US 2019/0372757 A1 Dec. 5, 2019

Related U.S. Application Data

(63) Continuation of application No. 15/206,136, filed on Jul. 8, 2016, now Pat. No. 10,333,699.

(60) Provisional application No. 62/235,403, filed on Sep. 30, 2015.

(51) Int. Cl.
*H04L 29/06* (2006.01)
*G06F 21/00* (2013.01)
*H04L 9/06* (2006.01)
*H04L 9/08* (2006.01)
*H04L 9/00* (2006.01)

(52) U.S. Cl.
CPC ............ *H04L 9/0662* (2013.01); *H04L 9/003* (2013.01); *H04L 9/085* (2013.01); *H04L 9/0869* (2013.01); *H04L 2209/04* (2013.01)

(58) Field of Classification Search
CPC ....... H04L 9/0662; H04L 9/085; H04L 9/003; H04L 9/0869; H04L 2209/04
See application file for complete search history.

(56) References Cited

U.S. PATENT DOCUMENTS

| | | | |
|---|---|---|---|
| 5,361,062 A * | 11/1994 | Weiss | G07C 9/21 340/5.26 |
| 5,337,270 A | 12/1994 | Koopman, Jr. et al. | |
| 5,377,270 A * | 12/1994 | Koopman, Jr. | H04L 9/12 340/5.26 |
| 6,278,783 B1 | 8/2001 | Kocher et al. | |
| 6,295,606 B1 | 9/2001 | Messerges et al. | |
| 7,110,539 B1 * | 9/2006 | Bao | H04L 9/0637 380/259 |
| 7,302,565 B2 * | 11/2007 | Meandzija | H04L 63/0407 713/155 |

(Continued)

*Primary Examiner* — Lisa C Lewis
(74) *Attorney, Agent, or Firm* — Lowenstein Sandler LLP

(57) ABSTRACT

Share values for use in a cryptographic operation may be received and the cryptographic operation may be performed based on the share values. A pseudorandom number that is to be used by the cryptographic operation may be identified and the pseudorandom number may be generated based on a portion of the share values that are used in the cryptographic operation. The cryptographic operation may then be performed based on the generated pseudorandom number.

20 Claims, 4 Drawing Sheets

(56) References Cited

U.S. PATENT DOCUMENTS

| | | | |
|---|---|---|---|
| 7,334,133 B2 | 2/2008 | Goubin | |
| 7,848,515 B2 | 12/2010 | Dupaquis et al. | |
| 8,050,402 B2 | 11/2011 | Golic | |
| 8,824,677 B1 * | 9/2014 | Ramzan | H04L 9/0869 |
| | | | 380/268 |
| 9,231,926 B2 * | 1/2016 | Adkins | H04L 9/0866 |
| 9,444,694 B1 * | 9/2016 | Sweeting | H04L 67/1002 |
| 2001/0039630 A1 * | 11/2001 | Kursawe | G06F 11/187 |
| | | | 714/4.1 |
| 2003/0053625 A1 * | 3/2003 | Bially | H04L 9/0631 |
| | | | 380/42 |
| 2005/0219149 A1 * | 10/2005 | Tuyls | G09C 5/00 |
| | | | 345/4 |
| 2011/0286594 A1 * | 11/2011 | Resch | G06F 11/10 |
| | | | 380/46 |
| 2015/0110266 A1 | 4/2015 | Debraize | |
| 2016/0087792 A1 * | 3/2016 | Smith | H04L 9/0662 |
| | | | 380/278 |

* cited by examiner

GENERATING A PSEUDORANDOM NUMBER BASED ON A PORTION OF SHARES USED IN A CRYPTOGRAPHIC OPERATION

RELATED APPLICATION

This application is a continuation of U.S. patent application Ser. No. 15/206,136 filed on Jul. 8, 2016, which claims the benefit under 35 U.S.C. § 119(e) of U.S. Provisional Application 62/235,403 filed on Sep. 30, 2015, which are hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
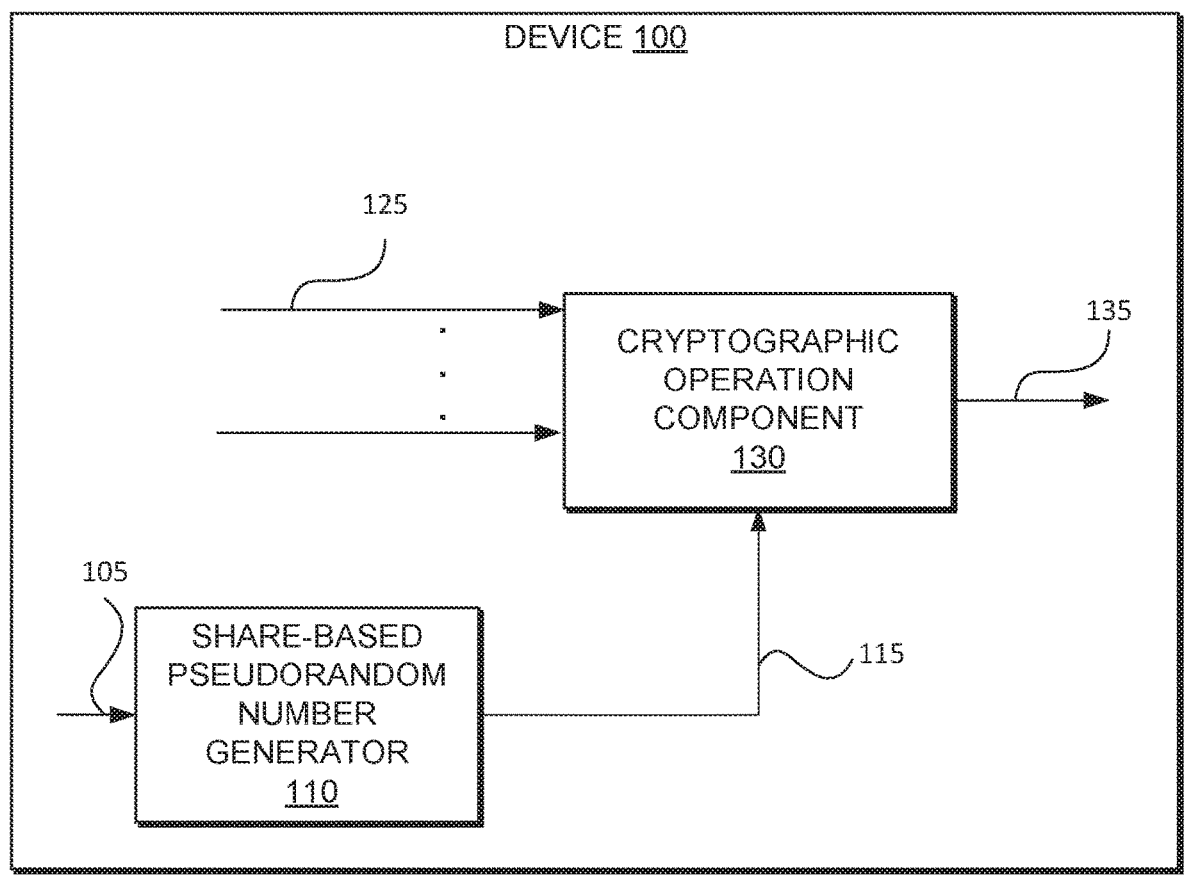
FIG. 1 illustrates an example device with a share-based pseudorandom number generator in accordance with some embodiments.

Aspects of the present disclosure are directed to generating a pseudorandom number based on a portion of shares that are used in a cryptographic operation. In general, a cryptographic operation may be performed for a particular value based on multiple shares that correspond to the particular value. The value that is used in the cryptographic operation may be split into multiple shares, or share values, and the cryptographic operation may be performed on the multiple shares that represent the value. Furthermore, a combination of the shares may represent the value (e.g., a mathematical combination of each of the shares may result in the value). For example, an exclusive-or (XOR) operation, a summation operation, or another logical or arithmetic operation may be performed with each of the shares to generate the value that is represented by the shares.

The use of the shares by the cryptographic operation may provide protection against a side channel attack where an attacker of an integrated circuit may obtain a secret value (e.g., a cryptographic key) that is used during the performance of the cryptographic operation. An example of such a side channel attack includes, but is not limited to, a differential power analysis (DPA) attack where an attacker who seeks to obtain the secret value from the integrated circuit may study the power consumption of the integrated circuit as the secret value is used in a cryptographic operation being performed by the integrated circuit. The attacker may be an unauthorized entity that may obtain the secret value from the integrated circuit by analyzing power consumption measurements of the integrated circuit over a period of time as the secret value is used in the cryptographic operation.

The splitting of the secret value into multiple shares may provide resistance to a DPA attack since the cryptographic operation is performed with the shares as opposed to the secret value itself. Thus, the power consumption measurements may not directly reflect the secret value, but instead each individual share.

The performance of the cryptographic operation with the shares may specify a conversion between one type of share to another type of share. For example, the cryptographic operation may specify the conversion of a Boolean masked share (e.g., when a Boolean operation on a combination of shares results in the secret value) to an arithmetically masked share (e.g., when an arithmetic operation on the combination of shares results in the secret value) or the conversion of the Boolean masked share to a multiplicatively masked share (e.g., when a multiplication operation on the combination of shares results in the secret value). The conversion between such types of shares may be based on a randomly generated number. Furthermore, the cryptographic operation may generate a new share (e.g., if a particular time or state of the cryptographic operation needs to operate with an additional share). The generation of the new share may be based on a randomly generated number.

Generating the random number may be performed by a random number generator of an integrated circuit. However, the cryptographic operation designated to use the random number may be operating at a faster rate than the capacity of the random number generator to generate the random number. In such a case, the performance or throughput of the cryptographic operation may be limited by the random number generator.

Aspects of the present disclosure address the above and other deficiencies by generating a pseudorandom number that is based on a portion of the shares that are used in the cryptographic operation. For example, the cryptographic operation may receive multiple shares that correspond to a secret value. One or more of the multiple shares, but not all of the multiple shares, may be provided as a seed value to a pseudorandom number generator to generate a pseudorandom number based on the seed value that corresponds to one or more, but not all, of the shares that are also inputs to the cryptographic operation. Thus, when a random number is required by the cryptographic operation, the pseudorandom number generator may provide a pseudorandom number based on the seed value as opposed to requesting a random number generator to generate a new random number.

As a result, the generation of the pseudorandom number based on the portion of the shares without using a random number generator may allow a cryptographic operation to operate at a faster rate than with the use of the random number generator.

FIG. 1 illustrates an example device 100 with a share-based pseudorandom number generator. In general, the device 100 may correspond to an integrated circuit such as a system on a chip (SoC). The device 100 may include multiple cryptographic operation components that may perform a cryptographic operation based on multiple shares that correspond to a secret value.

As shown in FIG. 1, the device 100 may include a share-based pseudorandom number generator 110 and cryptographic operation component 130. The device 100 may generate or receive multiple shares 125. For example, the device 100 may receive or identify a secret value (e.g., from a memory of the device 100) and may generate the multiple shares 125 that correspond to the secret value or may receive the multiple shares 125 that correspond to the secret value. The cryptographic operation component 130 may receive each of the multiple shares 125 where a combination of each of the multiple shares 125 may result in the secret value. The cryptographic operation component 130 may perform a cryptographic operation with the multiple shares 125 to generate one or more outputs 135. Examples of such a cryptographic operation include, but are not limited to the Data Encryption Standard (DES) block cipher, the triple-DES block cipher, the Advanced Encryption Standard (AES) block cipher the Secure Hash Algorithm (SHA)-1 hash function, the SHA-2 hash function, the SHA-3 hash function, the keyed-Hash Message Authentication Code (HMAC)-SHA-1 MAC function, the HMAC-SHA-2 MAC function the HMAC-SHA-3 MAC function, the RSA private key operation, the Diffie-Hellman key exchange function and Elliptic Curve Cryptography (ECC) functions such as ECDSA, ECDH and ECIES. Furthermore, the share-based pseudorandom number generator 110 may receive a portion of the shares 105 and generate a pseudorandom number 115 (or multiple pseudorandom numbers in response to a request to generate multiple pseudorandom numbers) that is transmitted to and received by the cryptographic operation component 130. Thus, the share-based pseudorandom number generator 110 may receive a proper subset (e.g., not all) of the shares that are received by the cryptographic operation component 130 and may generate a pseudorandom number and provide the pseudorandom number to the cryptographic operation component 130. The share-based pseudorandom number generator 110 may be based on, but is not limited to, a linear congruential generator, a non-linear feedback shift register, or a sponge function. In some embodiments, the sponge function may be associated with a finite internal state and may receive an input bit stream of any length and may produce an output bit stream of a desired length. Thus, a sponge-based pseudorandom number generator may receive one or more of the shares and may generate a pseudorandom output.

In operation, the cryptographic operation component 130 may perform a cryptographic operation based on the multiple shares 125. For example, the multiple shares 125 may correspond to a secret value that is a cryptographic key that is used with additional data to generate a cryptographic proof for authentication of the device 100. During the performance of the cryptographic operation, a new share or a conversion from one type of share (e.g., of the type of the multiple shares 125) to another type of share may be specified. Such a specification may be based on a pseudorandom number. As a result, the cryptographic operation component 130 may request that the share-based pseudorandom number generator 110 generate or provide the pseudorandom number 115 so that the cryptographic operation may generate the new share or may convert one or more of the multiple shares 125 to one or more of another type of multiple shares. The share-based pseudorandom number generator 110 may receive a portion or a proper subset of the multiple shares 125 and may generate the pseudorandom number 115 in response to the request. Thus, the output 135 of the cryptographic operation component may be generated by the shares 125 and a pseudorandom number that is generated based on a seed value corresponding to a portion of the shares 105.

The seed value that is used for the share-based pseudorandom number generator 110 to generate the pseudorandom number 115 may be based on a frequency of use of the multiple shares 125 by the cryptographic operation component 130. For example, the portion of the shares 105 may be selected or be based on the shares that are less used by the cryptographic operation component 130. Further details with regard to the providing of a seed value to the pseudorandom number generator based on a frequency of use of the shares are described in conjunction with FIG. 3.

Figure 2:
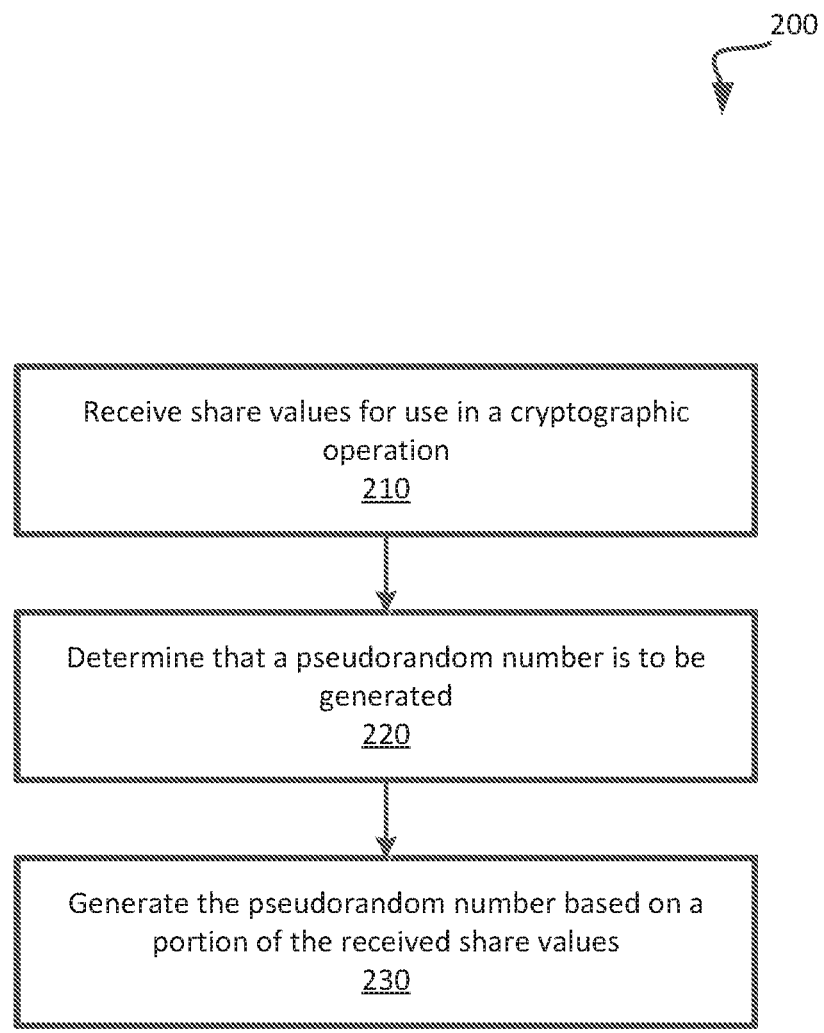
FIG. 2 is a flow diagram of an example method to generate a pseudorandom number in accordance with some embodiments of the present disclosure.

FIG. 2 is a flow diagram of an example method 200 to generate a pseudorandom number. In general, the method 200 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the device 100 of FIG. 1. For example, the method 200 may be performed by the share-based pseudorandom number generator 110 and the cryptographic operation component 130.

As shown in FIG. 2, the method 200 may begin with the processing logic receiving share values for use in a cryptographic operation (block 210). For example, multiple shares that correspond to a secret value may be received and a cryptographic operation may be performed on the received shares. The processing logic may further determine that a pseudorandom number is to be generated (block 220). For example, the cryptographic operation that is performed on the received shares may specify that a new share is to be generated and used in the cryptographic operation or that a conversion of the received shares to another type of share is to be performed. For example, a particular stage or state of the cryptographic operation may specify the new share or the conversion of the shares. In some embodiments, the new share may then be used with the other received shares during the cryptographic operation. Furthermore, the converting of the received shares to another type of share may correspond to converting the shares from a first type to a second type. The first type may correspond to a combination of the shares based on a first operation (e.g., a Boolean operation) resulting in the secret value and the second type may correspond to a combination of the shares based on a second operation (e.g., an arithmetic operation) resulting in the same secret value.

Referring to FIG. 2, the processing logic may subsequently generate the pseudorandom number based on a portion of the received share values (block 230). For example, one or more, but not all (e.g., a proper subset), of the shares that are received for use in the cryptographic operation may be provided as a seed value to a pseudorandom number generator so that a pseudorandom number may be generated and subsequently used in the cryptographic operation. For example, the pseudorandom number may be used to generate a new share or may be used to convert the received shares from one type to another type of share.

In some embodiments, when more than one pseudorandom number is to be generated, then all of the share values may be used to generate the pseudorandom numbers. Different proper subsets of the received share values may be used to generate different pseudorandom numbers so that all of the received share values are used to generate the pseudorandom numbers, but no single pseudorandom number is generated by using all of the received shares. As an example, four share values may be received and a first and second share value may be used to generate a first pseudorandom number and a third and fourth share value may be used to generate a second pseudorandom number.

Thus, a pseudorandom number may be generated based on a portion of the shares. The generation of the pseudorandom number may be based on, but is not limited to, the following operations as shown in Table 1:

TABLE 1

```
state= seed;
state= state*1664525 + 1013904223
returnValue = (uint8) (state >> 16)
returnValue = returnValue << 8
state = state*1664525 + 1013904223
returnValue |= (uint8) (state >> 16)
returnValue = returnValue << 8
state= state*1664525 + 1013904223
returnValue |= (uint8) (state >> 16)
returnValue = returnValue << 8
state= state*1664525 + 1013904223
returnValue |= (uint8) (state >>16)
returnValue = returnValue << 8
```

In some embodiments, the 'returnValue' may be the pseudorandom number that is generated by the share-based pseudorandom number generator that is to be used in a cryptographic operation. The 'state' may refer to an intermediate value used to generate the pseudorandom number where the first value of the intermediate value corresponds to the seed value. For example, a first memory element (e.g. a register) may store the 'returnValue' and a second memory element (e.g., another register) may store the 'state.' The first memory element and the second memory element may be updated based on the operations as shown in Table 1. At the completion of the operations, the final value stored in the first memory element corresponding to the 'returnValue' may be provided as the pseudorandom number. Furthermore, the seed value may correspond to one of the shares, or a combination of a portion of the shares.

The pseudorandom number may then be used to convert shares from one type to another type or to generate a new share. As an example, the conversion of a share from a Boolean masked share to an arithmetic masked share may be based on, but is not limited to, the following operations as shown in Table 2:

TABLE 2

```
T = x' ^ G
T = T - G
T = T ^ x'
G = G ^ r
A = x' ^ G
A = A - G
A = A ^ T
```

In some embodiments, G may correspond to a generated pseudorandom number as described in conjunction with Table 1, x' may correspond to one of the shares in a Boolean representation. Furthermore, r may correspond to another one of the shares in the Boolean representation, T may correspond to an intermediate variable, and A may correspond to one of the shares has have been converted to an arithmetic representation. In some embodiments, the final value of A (e.g., the converted share) may be a value so that x'^r=A+r. The intermediate variable T may be stored in a first memory element that is updated based on the operations of Table 2 and the variable A may be stored in a second memory element that is further updated based on the operations of Table 2.

As another example, the generation of a new share may be based on receiving a new share 's' based on the operations as described in conjunction with Table 1 (e.g., where the 'returnValue' corresponds to the new share 's') by using the x' value and generating a new share by performing an operation of x'^s.

Figure 3:
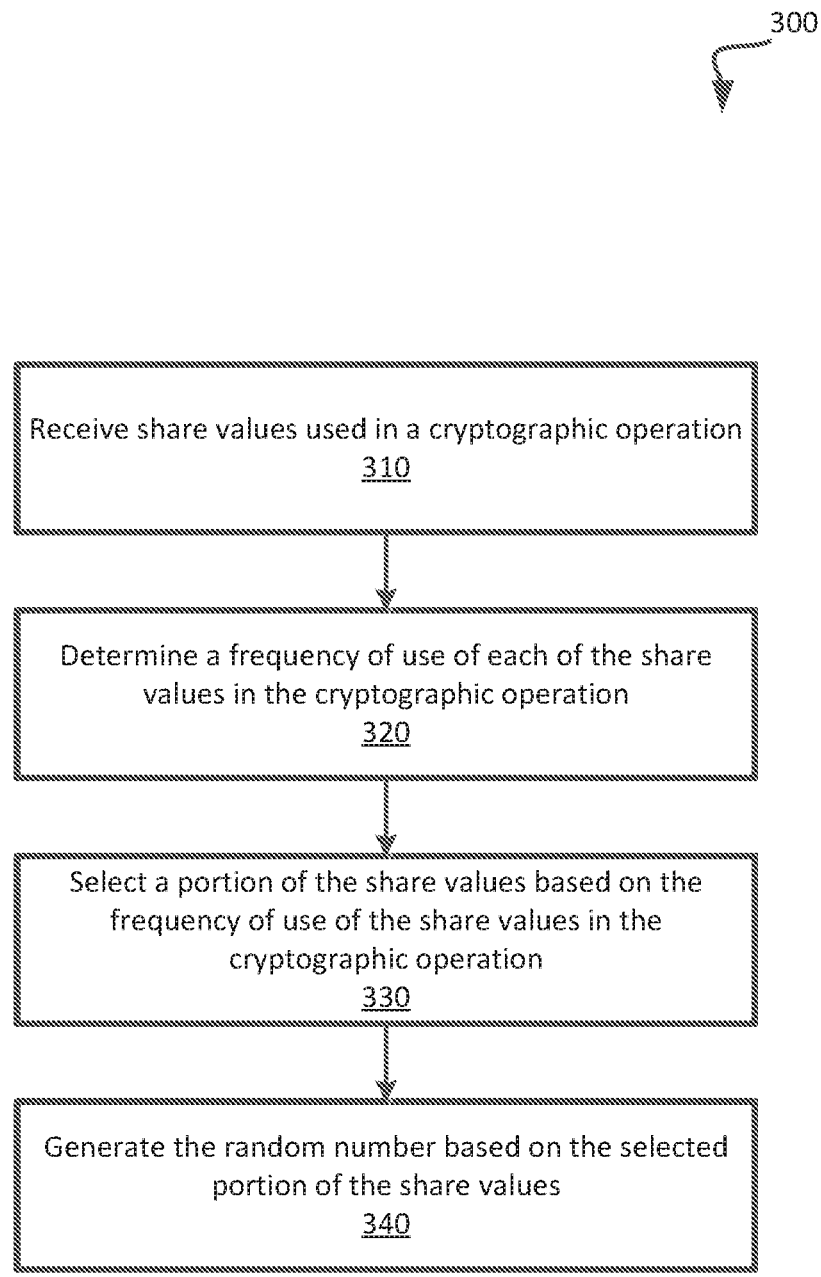
FIG. 3 is a flow diagram of an example method to generate a pseudorandom number based on a frequency of use of one or more shares by a cryptographic operation in accordance with some embodiments.

FIG. 3 is a flow diagram of an example method 300 to generate a pseudorandom number based on a frequency of use of one or more shares by a cryptographic operation. In general, the method 300 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the device 100 of FIG. 1. For example, the method 300 may be performed by the share-based pseudorandom number generator 110 and the cryptographic operation component 130.

As shown in FIG. 3, the method 300 may begin with the processing logic receiving share values that are used in a cryptographic operation (block 310). The processing logic may further determine a frequency of use of each of the share values in the cryptographic operation (block 320). For example, a number of operations performed for each of the share values during the cryptographic operation may be determined or may be identified. In some embodiments, a memory may identify the frequency of use of each share value for different cryptographic operations that may be performed. For example, a device that performs the cryptographic operation may perform multiple cryptographic operations and a memory of the device may identify the frequency of use of the inputs corresponding to share values for each of the cryptographic operations. For example, if the device is to perform a first cryptographic operation, then a first frequency of use of the inputs may be identified and if the device is to perform a second cryptographic operation that is different than the first cryptographic operation, then a second frequency of use of the inputs may be identified. Thus, different frequencies of use may be identified based on the different cryptographic operations that are to be performed.

The frequency of use of the share values may correspond to an amount of times that the share values are stored in memory or registers of a circuit that performs the cryptographic operation (e.g., the cryptographic operation component 130 of FIG. 1). For example, a share value that is used more often during the cryptographic operation may also be stored more frequently in the memory or registers of the circuit. A share value that is used less often during the cryptographic operation may be stored less frequently in the memory or registers of the circuit.

Referring to FIG. 3, the processing logic may further select a portion of the share values based on the frequency of use of the share values in the cryptographic operation (block 330). For example, a proper subset of the share values may be selected as a seed value for a pseudorandom number generator. The selected portion of the share values may be based on the share values that are less frequently used during the cryptographic operation. As an example, the cryptographic operation may receive a first share value, a second share value, and a third share value. The first share value may be used ten times in the cryptographic operation while the second share value is used five times and the third share value is used once. The third share value may be selected to be provided as the seed value to the pseudorandom number generator since the third share value is the least frequently used share value during the performance of the cryptographic operation. Alternatively, a combination of the second share value and the third share value may be provided as the seed value since the second and third share values are less frequently used than the first share value. Subsequently, the processing logic may generate the pseudorandom number based on the selected portion of the share values (block 340). For example, the pseudorandom number may be generated based on a portion of the share values that are less frequently used or stored in the cryptographic operation.

In some embodiments, the portion of the share values may be selected based on a characteristic associated with a share value. For example, one of the share values may be associated with an identification that the share value is a fixed value and is not changed during the cryptographic operation. Such a share value may be excluded from being selected as a share value for which a pseudorandom is to be based on.

Figure 4:
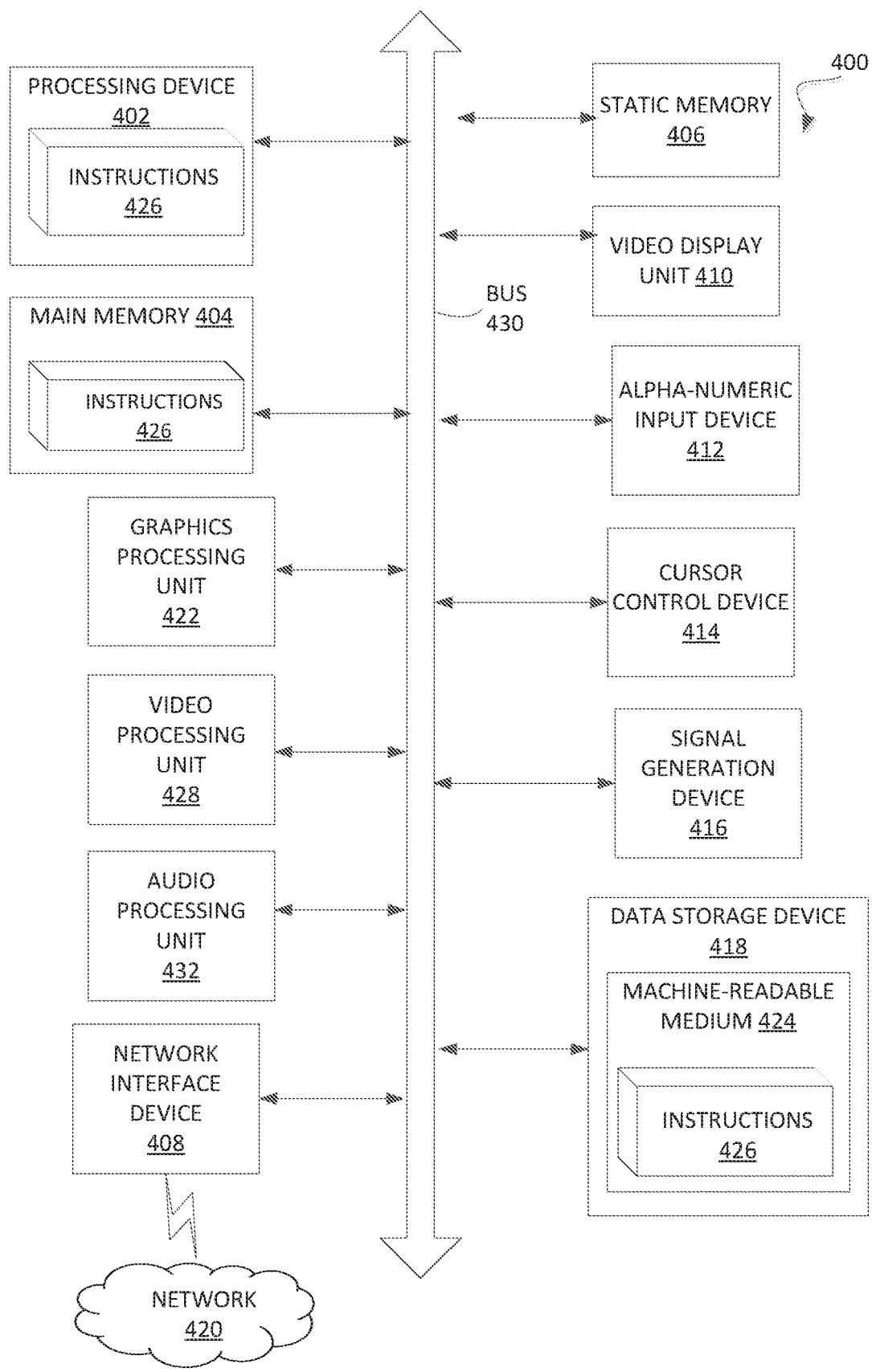
FIG. 4 illustrates a block diagram of an example computer system in which some embodiments of the disclosure may operate.

FIG. 4 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a computer-readable medium) on which is stored one or more sets of instructions or software 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In one implementation, the instructions 426 include instructions to implement functionality corresponding to the components of a device (e.g., device 100 of FIG. 1). While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   initiating, by a processing device, execution of a cryptographic operation involving each of a plurality of share values of a secret value;
   receiving, in conjunction with the cryptographic operation being executed, a request to generate, by the processing device, a pseudorandom number;
   determining, by the processing device, a seed value based on one or more of the plurality of share values; and
   generating, by the processing device, the pseudorandom number using the seed value.

2. The method of claim 1, wherein the secret value is an arithmetic sum of the plurality of share values.

3. The method of claim 1, further comprising:
   receiving a request to generate an additional pseudorandom number;
   determining a new seed value based on another one or more of the plurality of share values different than the one or more of the plurality of share values used for determining the seed value; and
   generating the additional pseudorandom number by using the new seed value.

4. The method of claim 1, wherein the cryptographic operation is one of a Data Encryption Standard (DES) operation, an Advanced Encryption Standard (AES) operation, or a hash-based operation.

5. The method of claim 1, wherein determining the seed value is based on the one or more of the plurality of share values that change during performance of the cryptographic operation.

6. The method of claim 1, wherein determining the seed value is based on a frequency of use of the one or more of the plurality of share values during performance of the cryptographic operation.

7. The method of claim 1, wherein determining the seed value is based on the one or more of the plurality of share values selected based on a number of times that the one or more of the plurality of share values are stored during performance of the cryptographic operation.

8. A system comprising:
   a memory; and
   a processing device, operatively coupled with the memory, to:
   initiate execution of a cryptographic operation involving each of a plurality of share values of a secret value;
   receive, in conjunction with the cryptographic operation being executed, a request to generate a pseudorandom number;
   determine a seed value based on one or more of the plurality of share values; and
   generate the pseudorandom number using the seed value.

9. The system of claim 8, wherein the secret value is an arithmetic sum of the plurality of share values is a proper subset of the plurality of share values.

10. The system of claim 8, wherein the processing device is further to:
    receive a request to generate an additional pseudorandom number;
    determine a new seed value based on another one or more of the plurality of share values different than the one or more of the plurality of share values used for determining the seed value; and
    generate the additional pseudorandom number by using the new seed value.

11. The system of claim 8, wherein the cryptographic operation is one of a Data Encryption Standard (DES) operation, an Advanced Encryption Standard (AES) operation, or a hash-based operation.

12. The system of claim 8, wherein to determine the seed value the processing device is to identify that the one or more of the plurality of share values change during performance of the cryptographic operation.

13. The system of claim 8, wherein
    the one or more of the plurality of share values are selected based on the frequency of use of the one or more of the plurality of share values during performance of the cryptographic operation.

14. The system of claim 8, wherein
    the one or more of the plurality of share values are selected based on a number of times that the one or more of the plurality of share values stored at the memory during performance of the cryptographic operation.

15. A non-transitory computer readable medium comprising instructions, which when executed by a processing device, cause the processing device to perform operations comprising:
    initiating execution of a cryptographic operation involving each of a plurality of share values of a secret value;
    receiving, in conjunction with the cryptographic operation being executed, a request to generate, by the processing device, a pseudorandom number;
    determining a seed value based on one or more of the plurality of share values; and generating the pseudorandom number using the seed value.

16. The non-transitory computer readable medium of claim 15, wherein the secret value is an arithmetic sum of the plurality of share values.

17. The non-transitory computer readable medium of claim 15, the operations further comprising:
   receiving a request to generate an additional pseudorandom number;
   determining a new seed value based on another one or more of the plurality of share values different than the one or more of the plurality of share values used for determining the seed value; and
   generating the additional pseudorandom number by using the new seed value.

18. The non-transitory computer readable medium of claim 15,
   wherein determining the seed value is based on the one or more of the plurality of share values that change during performance of the cryptographic operation.

19. The non-transitory computer readable medium of claim 15,
   wherein determining the seed value is based on the one or more of the plurality of share values selected based on a frequency of use of the one or more of the plurality of share values during performance of the cryptographic operation.

20. The non-transitory computer readable medium of claim 15,
   wherein determining the seed value is based on the one or more of the plurality of share values selected based on a number of times that the one or more of the plurality of share values are stored during performance of the cryptographic operation.

* * * * *